United States Patent
Bean et al.

(10) Patent No.: US 9,989,048 B2
(45) Date of Patent: Jun. 5, 2018

(54) END OF STROKE DETECTION FOR PLUNGER VELOCITY CORRECTION

(71) Applicant: Caterpillar Inc., Peoria, IL (US)

(72) Inventors: Sunil J. Bean, Peoria, IL (US); Alan R. Stockner, Metamora, IL (US); Joshua W. Steffen, El Paso, IL (US); Cory A. Brown, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 304 days.

(21) Appl. No.: 14/809,861

(22) Filed: Jul. 27, 2015

(65) Prior Publication Data

US 2017/0030344 A1 Feb. 2, 2017

(51) Int. Cl.
| | | |
|---|---|---|
| F04B 49/00 | (2006.01) |
| F04B 1/12 | (2006.01) |
| F04B 1/14 | (2006.01) |
| F04B 1/28 | (2006.01) |
| F04B 53/14 | (2006.01) |
| F04B 51/00 | (2006.01) |
| G01L 23/26 | (2006.01) |

(52) U.S. Cl.
CPC ............ *F04B 49/002* (2013.01); *F04B 1/128* (2013.01); *F04B 1/146* (2013.01); *F04B 1/28* (2013.01); *F04B 51/00* (2013.01); *F04B 53/14* (2013.01); *G01L 23/26* (2013.01)

(58) Field of Classification Search
CPC ........ F04B 49/002; F04B 51/00; F04B 53/14; F04B 1/146; F04B 1/128; F04B 1/28; G01L 23/26
See application file for complete search history.

(56) References Cited

U.S. PATENT DOCUMENTS

| | | | | |
|---|---|---|---|---|
| 5,344,385 A | * | 9/1994 | Buck ................... | A61M 1/1003 600/16 |
| 5,635,070 A | * | 6/1997 | Allington ........... | B01D 11/0203 210/416.1 |
| 6,283,720 B1 | | 9/2001 | Kottke | |
| 6,536,326 B2 | | 3/2003 | Unger et al. | |
| 7,705,479 B2 | | 4/2010 | Spenceley et al. | |
| 7,739,941 B2 | | 6/2010 | Noble et al. | |
| 8,726,785 B2 | | 5/2014 | Batenburg | |
| 2011/0260085 A1 | * | 10/2011 | van der Zee ....... | F16K 31/0627 251/129.15 |
| 2014/0182559 A1 | | 7/2014 | Steffen et al. | |
| 2014/0299544 A1 | * | 10/2014 | Wilt ..................... | A61M 1/1601 210/646 |

FOREIGN PATENT DOCUMENTS

WO WO 2014/138972 A1 9/2014

* cited by examiner

*Primary Examiner* — Peter J Bertheaud
*Assistant Examiner* — Dnyanesh Kasture
(74) *Attorney, Agent, or Firm* — Leydig, Voit & Mayer, Ltd.

(57) ABSTRACT

A method for controlling a stroke velocity in a pump includes using a sensor to detect a start of a pump stroke and an end of the pump stroke. A stroke time is calculated, the stroke time being a time period between the start of the pump stroke and the end of the pump stroke. The stroke velocity is calculated based on a stroke length and the stroke time. The stroke velocity is compared to a reference stroke velocity. A hydraulic supply pressure to the pump is increased if the calculated stroke velocity is less than the reference stroke velocity, and the hydraulic supply pressure is decreased if the calculated stroke velocity is more than the reference stroke velocity.

12 Claims, 8 Drawing Sheets

US 9,989,048 B2

END OF STROKE DETECTION FOR PLUNGER VELOCITY CORRECTION

TECHNICAL FIELD

This disclosure relates generally to hydraulic actuators and, more particularly, to detecting an end of stroke of a hydraulic piston.

BACKGROUND

Gaseous fuel powered engine applications are common in industry. Some of these applications require a cryogenic pump to transfer liquefied natural gas from a tank to an engine fuel system. Generally, for a hydraulically driven cryogenic pump, it is desirable to know if the pump is achieving full stroke with an intended stroke velocity. If too much hydraulic supply pressure is applied to actuate a hydraulic piston in a pump, the stroke velocity of the hydraulic piston will be higher than allowed for by design, which will degrade pump components or even lead to failure of the pump. If too little hydraulic supply pressure is applied to the hydraulic piston, the stroke velocity may be below a desired velocity or the pump may not perform a full hydraulic piston stroke, which may cause the pump to run inefficiently or not at all. A closed loop pressure control system for maintaining a desired difference in hydraulic and discharge pressure within a hydraulic system can be achieved, but such strategies may not capture other effects that affect stroke velocity such as physical wear, hydraulic oil viscous temperature effects, and offset errors in sensors.

SUMMARY

In one aspect, the disclosure describes a method for controlling a stroke velocity in a pump that includes using a sensor that is in electrical communication with a controller to detect a start of a pump stroke. The sensor is also used to detect an end of the pump stroke. A stroke time is calculated, the stroke time being a time period between the start of the pump stroke and the end of the pump stroke. The stroke velocity is calculated based on a stroke length and the stroke time. The calculated stroke velocity is compared to a reference stroke velocity. A hydraulic supply pressure to the pump is adjustably controlled such that the hydraulic supply pressure is increased if the calculated stroke velocity is less than the reference stroke velocity, and the hydraulic supply pressure is decreased if the calculated stroke velocity is more than the reference stroke velocity.

In another aspect, the disclosure describes a method for detecting a stroke velocity in a pump. A pressure sensor is used to detect a start of pump stroke. The pressure sensor is also used to detect an end of pump stroke. A stroke time is calculated, the stroke time being a time period between the start of the pump stroke and the end of the pump stroke. A pump stroke velocity is calculated based on a stroke length and the stroke time.

In yet another aspect, the disclosure describes a method for controlling a stroke velocity in a pump. A sensor that is in electrical communication with a controller is used to detect a start of a pump stroke and an end of the pump stroke. A stroke time is calculated, the stroke time being a time period between the start of the pump stroke and the end of the pump stroke. The stroke velocity is calculated based on a stroke length and the stroke time. An error in velocity is calculated, the error in velocity being a difference between the stroke velocity and a reference stroke velocity. Upon calculating the error in velocity, a hydraulic pressure correction is applied based on the error in velocity. A hydraulic pressure offset is determined, the hydraulic pressure offset being a summation of a reference offset pressure and the hydraulic pressure correction based on the error in velocity. A minimum intensification pressure is determined, the minimum intensification pressure being a gas accumulator pressure feedback divided by a hydraulic intensification ratio. A commanded hydraulic pressure is calculated, the commanded hydraulic pressure being the hydraulic pressure offset plus a minimum intensification pressure. An error in hydraulic pressure is calculated, the error in hydraulic pressure being a difference between the commanded hydraulic pressure and a hydraulic pressure feedback. The error in hydraulic pressure is an input for a PID controller. An output from the PID controller is used to determine a hydraulic pressure correction. A command is sent to an engine system based on the hydraulic pressure correction. The engine system responds to the command by changing the hydraulic pressure of a fluid supplied from a hydraulic pump to the cryogenic pump.

DETAILED DESCRIPTION

Figure 1:
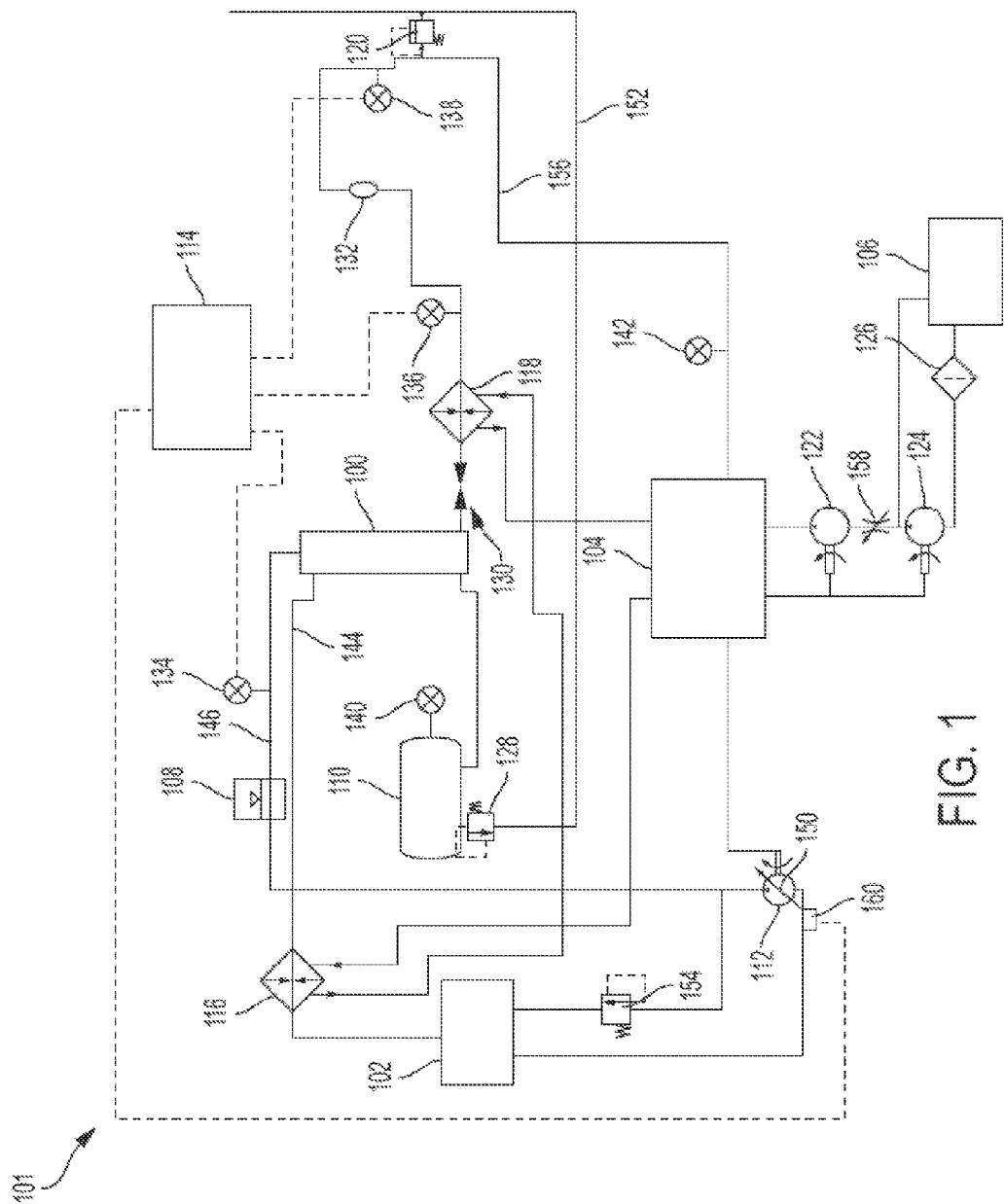
FIG. 1 is a schematic view of a hydraulic system in accordance with the disclosure.

FIG. 1 is a schematic view of a hydraulic system 101 configured to supply compressed natural gas ("CNG") to an engine 104. A cryogenic pump 100 is configured to transfer liquid natural gas ("LNG") from a LNG tank 110 to a vaporizer 118. A LNG tank pressure sensor 140 is connected to the LNG tank 110. A check valve 130 is disposed downstream of the cryogenic pump 100 and upstream from the vaporizer 118. In operation, the vaporizer 118 is configured to receive high pressure LNG from the cryogenic pump 100, convert the LNG into CNG and supply the CNG to an engine 104 via a high pressure CNG line 156. A gas accumulator 132 is disposed downstream of and in relative proximity of the vaporizer 118. A temperature sensor 136 is connected to the high pressure CNG line 156 downstream of and near the vaporizer 118. A gas accumulator pressure sensor 138 is connected to the high pressure CNG line 156 downstream of and near the gas accumulator 132. A gas rail pressure sensor 142 is connected to the high pressure CNG line 156 upstream of and near the engine 104.

A hydraulic oil line 146 supplies hydraulic oil from a hydraulic pump 112 to the cryogenic pump 100. A pressure in the hydraulic oil line 146 is a hydraulic supply pressure. The hydraulic pump 112 may include a pump actuator 160 and a rotatably mounted swash plate 150. The pump actuator 160 is configured to change the angle of the swash plate 150 within the hydraulic pump 112 in order to increase or decrease the pressure of the hydraulic oil line 146. A hydraulic accumulator 108 is disposed on the hydraulic oil line 146 downstream of the hydraulic pump 112 and upstream of the cryogenic pump 100. A hydraulic accumulator pressure sensor 134 is connected to the hydraulic oil line 146 downstream of and near the hydraulic accumulator 108. In operation, the cryogenic pump 100 uses the hydraulic oil to actuate at least one piston disposed in a hydraulic piston end 308 of the cryogenic pump 100. A low pressure hydraulic oil line 144 returns the oil from the cryogenic pump to a hydraulic reservoir 102, passing through oil cooler 116. The hydraulic reservoir 102 is configured to store hydraulic oil, collect oil from the low pressure hydraulic oil line 144, and supply hydraulic oil to the hydraulic pump 112.

A fuel reservoir 106 supplies fuel to the engine 104 via a fuel tank pump 124, an inlet metering valve 158, and a high pressure common rail ("HPCR") pump 122. A filter 126 is disposed downstream of the fuel reservoir 106 and upstream of the fuel tank pump 124. In operation, the inlet metering valve 158 regulates an amount of fuel sent to the HPCR pump 122, the HPCR pump 122 pressurizes the fuel that flows from the inlet metering valve 158, and a high pressure fuel leaves the HPCR pump 122 and flows to the engine 104.

The engine 104 forms a cooling circuit with the oil cooler 116 and the vaporizer 118. In operation, warm engine coolant is provided from the engine 104 and flows to the oil cooler 116. The low pressure hydraulic oil line 144 passing through the oil cooler 116 absorbs heat from the warm engine coolant. The engine coolant is provided from the oil cooler 116 and flows to the vaporizer 118. The vaporizer 118 uses the heat from the engine coolant to vaporize the LNG passing through the vaporizer 118. Cool engine coolant is provided from the vaporizer 118 back to the engine 104.

A first pressure relief valve 154 is disposed between the hydraulic reservoir 102 and the hydraulic pump 112. The first pressure relief valve 154 is connected to a line extending from the hydraulic reservoir 102 on one side and a relief line extending from the hydraulic pump 112 on another side. The first pressure relief valve 154 is configured to actuate when the pressure in the hydraulic oil line 146 exceeds a threshold value. A second pressure relief valve 128 is connected to the LNG tank 110 on one side and connected to a vent line 152 on another side. The second pressure relief valve 128 is configured to actuate when the pressure in the LNG tank 110 exceeds a threshold value. A third pressure relief valve 120 is connected to the high pressure CNG line 156 on one side and the vent line 152 on another side. The third pressure relief valve 120 is disposed downstream of and in relative proximity to the gas accumulator 132 and upstream of the engine 104. The third pressure relief valve 120 is configured to actuate when the pressure in the high pressure CNG line 156 exceeds a threshold value.

The gas accumulator pressure sensor 138, the hydraulic accumulator pressure sensor 134, and the temperature sensor 136 are all electrically connected to a controller 114. In an embodiment, the controller 114 is configured to electrically communicate with at least one of the gas accumulator pressure sensor 138, the hydraulic accumulator pressure sensor 134, and the temperature sensor 136. The controller 114 is configured to communicate with the hydraulic pump 112 to increase or decrease the pressure in the hydraulic oil line 146. For example, the controller 114 may control the pressure in the hydraulic oil line 146 by changing the angle of the swash plate 150 via the pump actuator 160.

Figure 3:
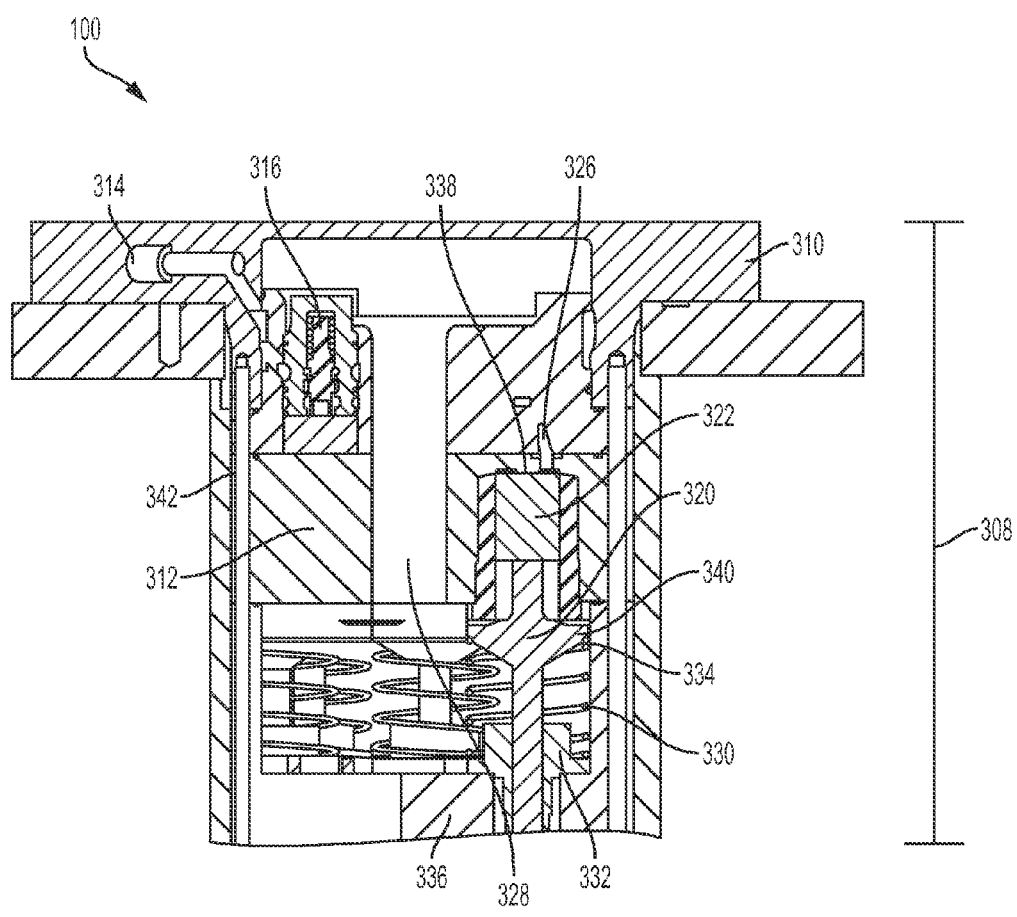
FIG. 3 is a section view of a hydraulic piston end of a cryogenic pump in accordance with the disclosure.

A shown in FIG. 3, in one embodiment, a top part of the cryogenic pump 100 is a hydraulic piston end 308. The cryogenic pump 100 may be standalone, as shown, or placed within a tank. The cryogenic pump 100 forms a generally cylindrical shaped body and forms a top flange 310. The top flange 310 forms a hydraulic passageway 314. The hydraulic passageway 314 is configured to receive hydraulic oil provided from the hydraulic pump 112 and to provide hydraulic oil to at least one pumping element within the cryogenic pump 100. A pumping element includes a hydraulic piston and components associated with the actuation of the hydraulic piston. One pumping element is fully shown in FIG. 4, but the cryogenic pump 100 can have multiple pumping elements.

For each pumping element, a spool valve 316 is configured to divert hydraulic oil from the hydraulic passageway 314 to a top surface 338 of a tappet 322 via a tappet fill passageway 326. The tappet 322 is a hydraulic piston in the disclosed hydraulic system 101. The tappet 322 is generally cylindrical in shape and is housed in a tappet housing 312. The tappet housing 312 is configured to mount to an inside surface 342 of the pump body. A bottom surface of the at least one tappet 322 is configured to contact a top surface of a pushrod 320. The pushrod 320 generally forms a cylindrical rod shape at a top part and a bottom part and a radially outward section 340 at a middle part of the pushrod 320. The pushrod 320 forms a groove 334 on an underside 428 of the radially outward section 340 to hold a top end of a tappet spring 330.

The tappet spring 330 is disposed between the pushrod 320 and a guide nut 332. A top end of the tappet spring 330 is disposed to contact the groove 334 of the pushrod 320 and a bottom end of the tappet spring 330 is configured to contact the guide nut 332. The guide nut 332 is mounted to a bottom plate 336 of the hydraulic piston end 308. The guide nut 332 forms a through hole along its axis of symmetry. The bottom part of the pushrod 320 is disposed to pass through the through hole of the guide nut 332.

In operation, hydraulic oil flowing from the tappet fill passageway 326 to the top surface 338 of the tappet 322 exerts hydraulic pressure on the tappet 322, moving the tappet 322 away from the tappet fill passageway 326. The movement of the tappet 322 away from the tappet fill passageway 326 causes a corresponding movement of the pushrod 320, which causes a corresponding movement of a plunger (not shown) that is connected on the other end of the pushrod 320. This movement represents an extension stroke of the tappet 322, or tappet extension stroke, as well as an extension stroke of the plunger, or plunger extension stroke. This movement also represents a pumping stroke of the cryogenic pump 100. A start of the movement of the tappet 322 away from the tappet fill passageway 326 corresponds to a start of stroke. An end of the movement in the direction away from the tappet fill passageway 326 corresponds to an end of stroke, which represents a fully extended position of the tappet 322. The tappet spring 330 provides force in the opposite direction to push the pushrod 320 and the tappet 322 towards the tappet fill passageway 326. The movement in the opposite direction, where the tappet 322 moves closer to the tappet fill passageway 326, represents a retraction stroke of the tappet 322 and a retraction stroke of the plunger. An end of the movement in the direction towards the tappet fill passageway 326 corresponds to a fully retracted position of the tappet 322. In operation, the cryogenic pump 100 draws in LNG from the LNG tank 110 during the retraction stroke of the plunger. The cryogenic pump 100 expels LNG to the vaporizer 118 during the extension stroke of the plunger.

Figure 4:
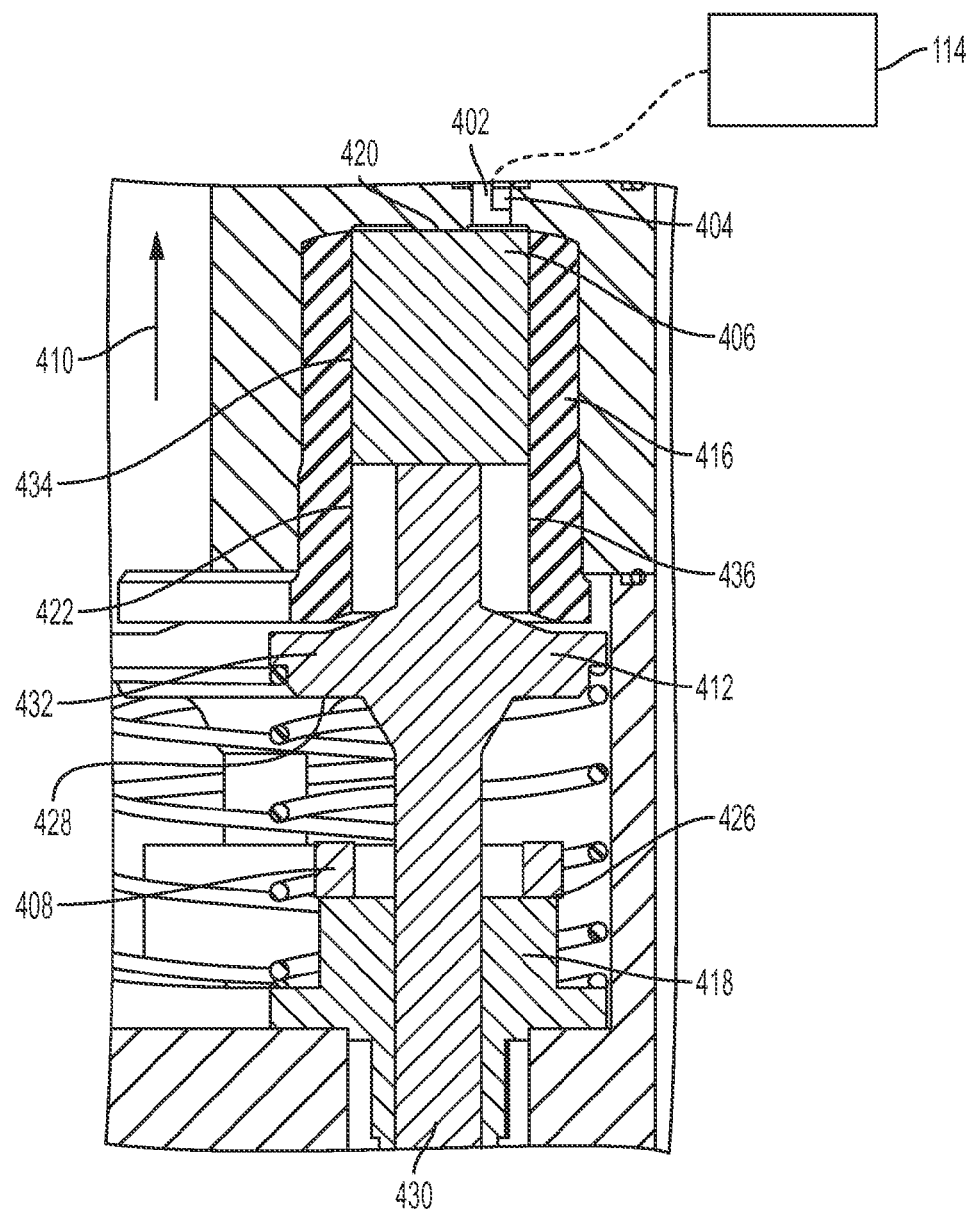
FIG. 4 is a section view of an embodiment in accordance with the disclosure.

A tappet fill passageway 402 is configured to provide hydraulic oil to a top surface 438 of a tappet 406, as shown in FIG. 4. A tappet 406 is housed within a tappet guide 416, the tappet guide 416 being generally cylindrical in shape. The tappet guide 416 forms a bore 436 and an inside surface 422. The bore 436 of the tappet guide 416 is generally the same cross section throughout an axis of symmetry of the tappet guide 416. The outer surface 434 of the tappet 406 is configured to form a slidable engagement with the inside surface 422 of the tappet guide 416. The slidable sealable engagement is configured to create a sealed volume, or a tappet chamber 420, between the top surface 438 of the tappet 406 and the tappet fill passageway 402 to contain hydraulic oil pressure. A length of the tappet guide 416 is greater than a length of the tappet 406 as measured along their respective axes of symmetry. The tappet 406 is configured to remain within the tappet guide 416 when the tappet 406 moves with respect to the tappet guide 416. In operation, during the extension stroke of the tappet 406, the tappet chamber 420 is formed above the tappet 406 within the tappet guide 416. At an end of the extension stroke, the tappet 406 is located at the fully extended position, and the tappet chamber 420 is at its largest volume. At least one pressure sensor is disposed within the cryogenic pump 100. In one embodiment, a tappet pressure sensor 404 is in fluid communication with the tappet fill passageway 402 near the tappet chamber 420. For a cryogenic pump 100 with multiple pumping elements, the tappet pressure sensor 404 may be associated with at least one pumping element. The tappet pressure sensor 404 is configured to electrically communicate with the controller 114 and provide information indicative of fluid pressure within the tappet chamber 420.

The extension stroke of the cryogenic pump 100 includes a start of stroke and an end of stroke. The controller 114 is configured to detect the end of the stroke via at least one of the sensors in the hydraulic system 101. In one embodiment, the at least one sensor, such as the tappet pressure sensor 404, is disposed within the cryogenic pump 100. In another embodiment, the at least one sensor, such as the gas accumulator pressure sensor 138, the hydraulic accumulator pressure sensor 134, and the temperature sensor 136, is disposed outside of the cryogenic pump 100 but within the hydraulic system 101.

In one embodiment, where the at least one sensor is disposed within the cryogenic pump 100, an end stop 408 is positioned on a top surface 426 of a guide nut 418 as shown in FIG. 4. The end stop 408 is generally ring shaped with an exterior diameter similar to the diameter of the top surface 426 of the guide nut 418. The end stop 408 forms a central bore, the central bore configured to allow a bottom part 430 of a pushrod 412 to pass through. In operation, when the pushrod 412 moves away from the tappet fill passageway 402 because of the hydraulic oil flow into the tappet chamber 420, an underside 428 of a radially outward section 432 of the pushrod 412 abuts a top surface of the end stop 408 such that the pushrod 412 is prevented from moving further away from the tappet fill passageway 402.

Consequently, the tappet 406 is also prevented from moving further away from the tappet fill passageway 402, which causes a pressure rise in the tappet chamber 420. In operation, the tappet pressure sensor 404 detects a pressure in the tappet chamber 420 and sends pressure signals to the controller 114. The end stop 408 is configured to amplify a pressure signal caused by the abutment of the pushrod 412 with the end stop 408.

Figure 7A:
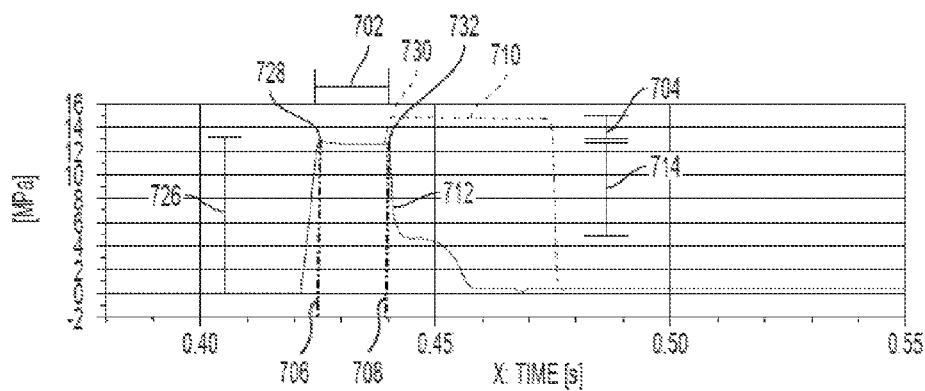
FIG. 7a is a plot of pressure over time in accordance with the disclosure.

A pressure sensor profile 710, as shown in FIG. 7a, is a plot of pressure measurements from the tappet pressure sensor 404 over time for a cryogenic pump 100 configured with the end stop 408. When a tappet 406 performs an extension stroke, there is a pressure rise in the tappet chamber 420. A start of stroke 706 is represented by a first peak 728 of a first pressure rise 726 in the tappet chamber 420. In operation, at an end of stroke 708, the end stop 408 causes the tappet 406 to stop moving, resulting in a second pressure rise 704 in the tappet chamber 420. The end of stroke 708 is represented by a first peak 730 of the second pressure rise 704. A difference in time between the start of stroke 706 and the end of stroke 708 represents a stroke time 702.

Figure 5:
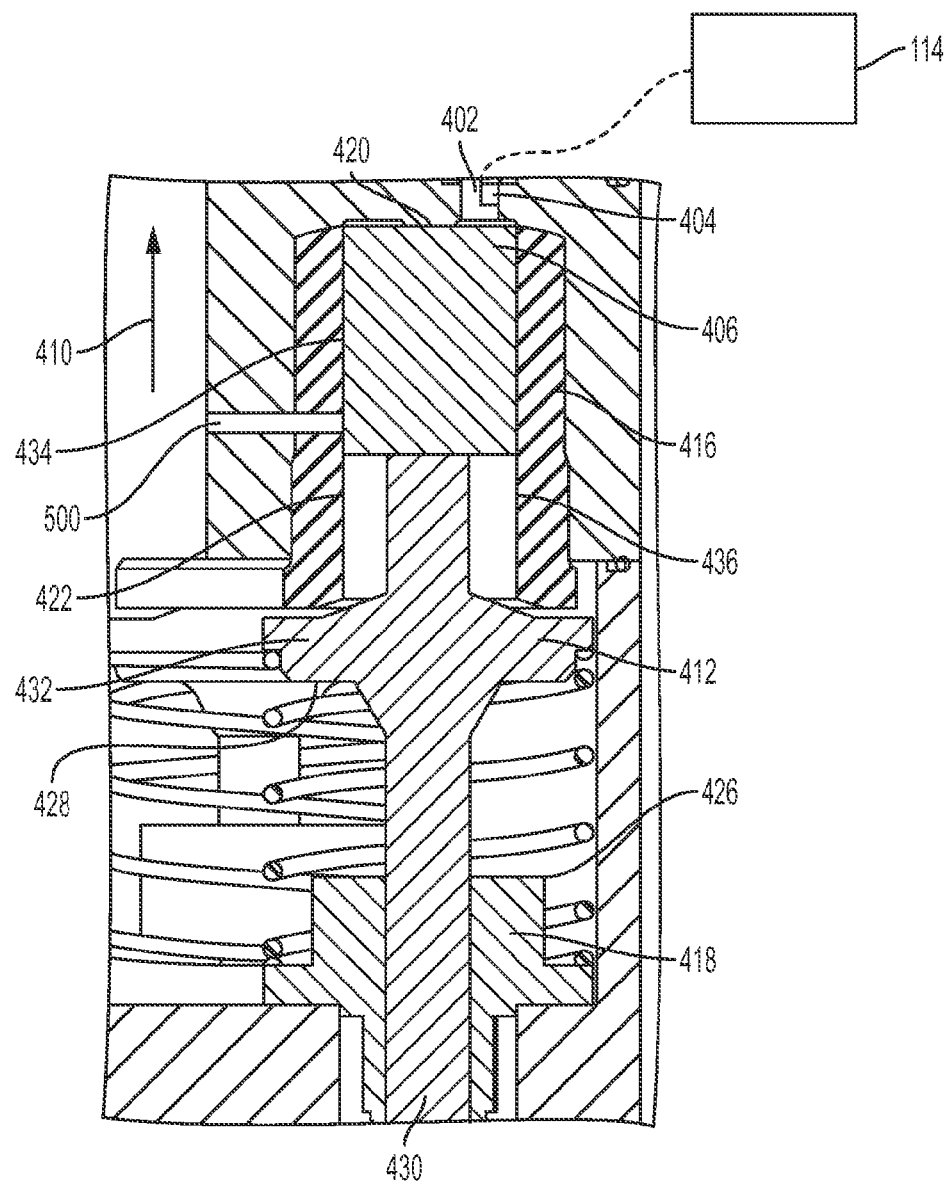
FIG. 5 is a section view of another embodiment in accordance with the disclosure.

In an alternative embodiment, where the at least one sensor is disposed within the cryogenic pump 100, the tappet guide 416 forms a drain orifice 500 perpendicular to the inside surface 422 of the tappet guide 416 as shown in FIG. 5. The drain orifice 500 begins adjacent the inside surface 422 of the tappet guide 416 and extends therethrough to the oil return line 410. The drain orifice 500 is disposed such that it becomes exposed to the tappet chamber 420 when the tappet 406 is located near its fully extended position. In operation, the tappet pressure sensor 404 detects the pressure in the tappet chamber 420 and sends pressure signals to the controller 114.

A pressure sensor profile 712, as shown in FIG. 7a, is a plot of pressure measurements from the tappet pressure sensor 404 over time for a cryogenic pump 100 configured to form the drain orifice 500. When a tappet 406 performs an extension stroke, there is a pressure rise in the tappet chamber 420. A time corresponding to a first peak 728 of a first pressure rise 726 represents a start of stroke 706. In operation, at the end of stroke, the hydraulic oil in the tappet chamber 420 flows through the drain orifice 500, resulting in a pressure drop 714 in the tappet chamber 420. A time corresponding to a start of the pressure drop 714 represents the end of stroke 708. A difference in time between the start of stroke 706 and the end of stroke 708 represents the stroke time 702.

Figure 6:
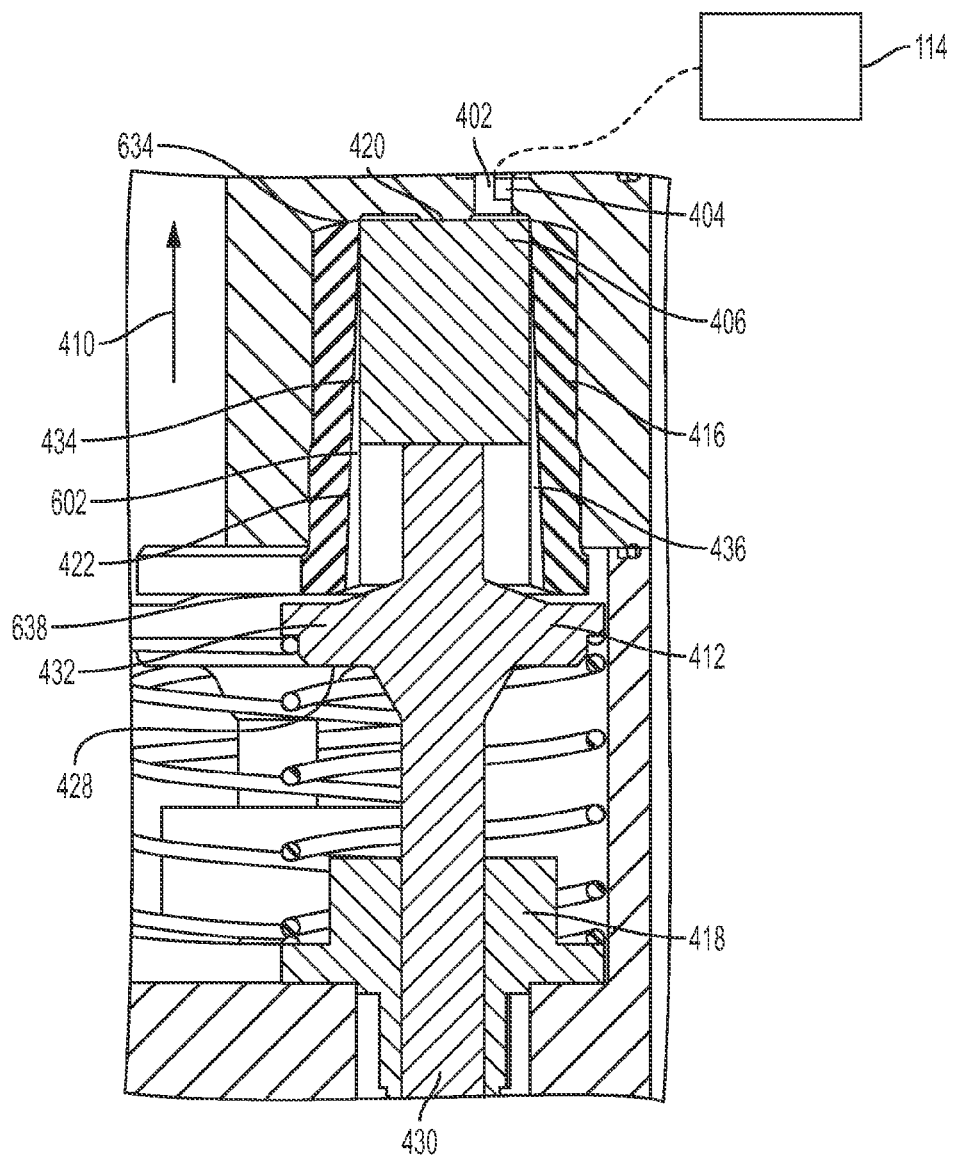
FIG. 6 is a section view of yet another embodiment in accordance with the disclosure.

In yet another embodiment, where the at least one sensor is disposed within the cryogenic pump 100, the bore 436 of the tappet guide 416 varies in diameter along the length of the tappet guide 416, as shown in FIG. 6. The bore 436 of the tappet guide 416 increases in diameter with respect to its axis of symmetry from a top surface 634 of the tappet guide 416 to a bottom surface 638 of the tappet guide 416 such that the inside surface 422 of the tappet guide 416 forms a gap 602, a radial dimension of which increases from the outer surface 434 of the tappet 406 along the length of the tappet guide 416. The bore 436 adjacent the top surface 634 of the tappet guide 416 is configured to sealably and slidably engage the outer surface 434 of the tappet 406. When a tappet 406 performs an extension stroke, there is a pressure rise in the tappet chamber 420. The start of stroke 706 corresponds to a start of the pressure rise. At the end of the extension stroke, the tappet 406 is located near its fully extended position, corresponding to a widest part of the gap 602 between the inside surface 422 of the tappet guide 416 and the outer surface 434 of the tappet 406. In operation, the hydraulic oil leaks from the tappet chamber 420 through the gap 602 at different rates as the tappet 406 moves along the length of the tappet guide 416. When the tappet 406 is located near its fully extended position, the hydraulic oil leak through the gap 602 relieves pressure from the tappet chamber 420. Consequently, the controller 114, is configured to detect a beginning of a pressure drop in the tappet chamber 420 via the tappet pressure sensor 404. The end of stroke 708 corresponds to the start of the pressure drop. The stroke time 702 is represented by the difference in time between the start of stroke 706 and the end of stroke 708.

Figure 2A:
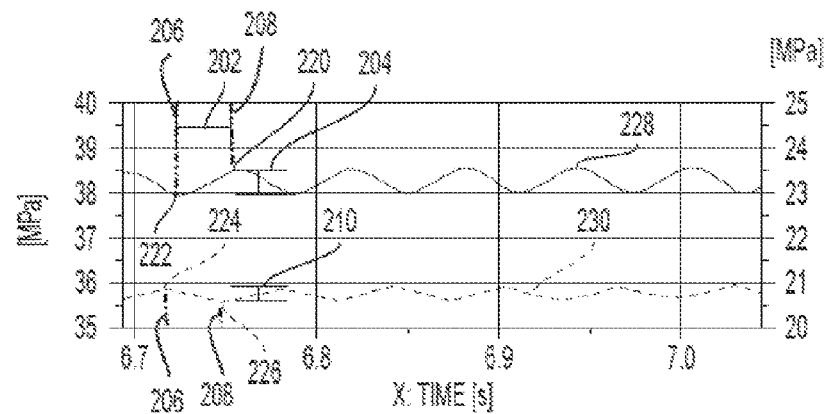
FIG. 2a shows a plot of pressure over time in accordance with the disclosure.

In one embodiment, where the at least one sensor is disposed outside the cryogenic pump 100, the controller 114 is configured to detect the end of stroke via the gas accumulator pressure sensor 138. When the tappet 406 performs the extension stroke, there is a pressure rise 204 in the gas accumulator 132. As shown in FIG. 2a, a pressure profile 228 of the gas accumulator pressure sensor 138 is a plot of pressure measurements from the gas accumulator pressure sensor 138 over time. The pressure profile 228 forms a wave with a crest 220 and a trough 222. The pressure rise 204 corresponds to a difference in pressure between the crest 220 and the trough 222 of the pressure profile 228. A start of stroke 206 corresponds to the trough 222 of the pressure profile 228. An end of stroke 208 corresponds to the following crest 220 of the pressure profile 228. A difference in time between the start of stroke 206 and the end of stroke 208 represents a stroke time 202.

In another embodiment, where the at least one sensor is disposed outside the cryogenic pump 100, the controller 114 is configured to detect the end of stroke via the hydraulic accumulator pressure sensor 134. As shown in FIG. 2a, a pressure profile 230 of the hydraulic accumulator pressure sensor 134 is a plot of pressure measurements from the hydraulic accumulator pressure sensor 134 over time. When the tappet 406 performs the extension stroke, there is a pressure drop 210 in the hydraulic accumulator 108. The pressure profile 230 forms a wave with a crest 224 and a trough 226. A difference in pressure between the crest 224 and the trough 226 of the pressure profile 230 represents the pressure drop 210 during the extension stroke. The start of stroke 206 corresponds to the crest 224 of the pressure profile 228. The end of stroke 208 corresponds to the following trough 226 of the pressure profile 228. A difference in time between the start of stroke 206 and the end of stroke 208 represents the stroke time 202.

In yet another embodiment where the at least one sensor is disposed outside the cryogenic pump 100, the controller 114 is configured to detect the end of tappet stroke via the temperature sensor 136. When the tappet 406 performs the extension stroke, there is a temperature fall in the gas accumulator 132. A difference in temperature between a crest and a trough of a temperature profile (not shown) generated by the temperature sensor 136 represents the temperature rise. The start of stroke 206 corresponds to the crest of the temperature profile. The end of stroke 208 corresponds to the following trough of the temperature profile. A difference in time between the start of stroke 206 and the end of stroke 208 represents the stroke time 202.

Figure 2B:
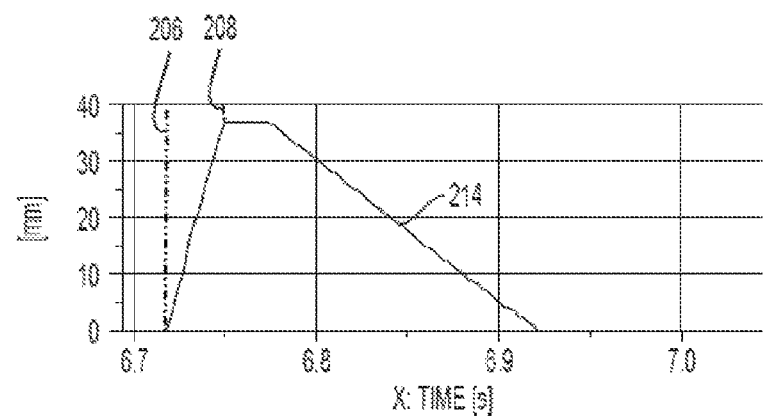
FIG. 2b shows a plot of tappet displacement over time in accordance with the disclosure.

A displacement profile 214 corresponding to the pressure profile 228 of the gas accumulator pressure sensor 138 is shown in FIG. 2b. While the displacement profile 214 data may not be available to the controller 114 in operation of the pump 100 for some disclosed embodiments, the displacement profile data here is used to verify that the gas accumulator pressure sensor 138 accurately detects the end of stroke 208. The start of stroke 206 corresponds to a zero pump displacement when the pressure in the gas accumulator 132 is at the trough 222 and when the pressure in the hydraulic accumulator 108 is at the crest 224. The end of stroke 208 corresponds to a time when the gas accumulator pressure is at the crest 220 as well as when the hydraulic accumulator pressure is at the trough 226.

Figure 7B:
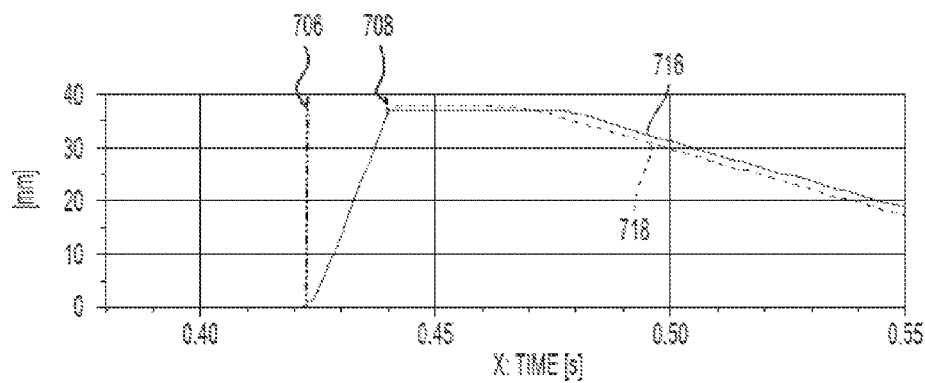
FIG. 7b is a plot of tappet displacement over time in accordance with the disclosure.

FIG. 7b shows a displacement profile 716 corresponding to the pressure sensor profile 710 of the cryogenic pump 100 configured with the end stop 408 and a displacement profile 718 corresponding to the pressure sensor profile 712 of the cryogenic pump 100 configured to form the drain orifice 500. The displacement profile 716, 718 data here is used to verify that the in pump sensing methods accurately detect the end of stroke 708. For the displacement profile 716 of the end stop 408 embodiment, the start of stroke 706, where the tappet pressure sensor 404 detects the first peak 728 of the first pressure rise 726, corresponds to a zero tappet displacement. The end of stroke 708, where the tappet pressure sensor 404 detects the first peak 730 of the second pressure rise 704, corresponds to a tappet 406 that is fully extended. For the displacement profile 718 of the drain orifice 500 embodiment, the start of stroke 706, where the tappet pressure sensor 404 detects the first peak 728 of the first pressure rise 726, corresponds to a zero tappet displacement. The end of stroke 708, where the tappet pressure sensor 404 detects a start 732 of the pressure drop 714, corresponds to a tappet 406 that is fully extended.

The controller 114 is configured to calculate a stroke velocity during the stroke of the tappet 406. For embodiments where the at least one sensor is disposed outside of the cryogenic pump 100, the controller 114 uses at least one of the gas accumulator pressure sensor 138, the hydraulic accumulator pressure sensor 134, and the temperature sensor 136 to calculate the stroke time 202. For embodiments where the at least one sensor is disposed inside the cryogenic pump 100, the controller 114 uses the tappet pressure sensor 404 to calculate the stroke time 202, 702. A stroke length is known for a given pump system. Thus, the controller 114 is configured to divide the stroke length by the stroke time 202, 702 to determine the tappet velocity.

Figure 2C:
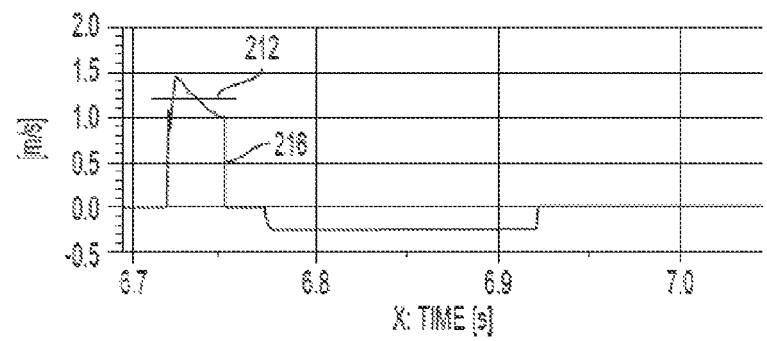
FIG. 2c shows a plot of tappet velocity over time in accordance with the disclosure.

FIG. 2c shows a velocity profile 216 corresponding to the displacement profile 214. For a velocity profile shape that does not form a square wave, as in FIG. 2c, an actual average velocity 212 is calculated. For the embodiment shown in FIG. 2a-c, the known stroke length is 36.9 mm and the calculated stroke time 202 is 31 ms. Therefore, the calculated average velocity is 1.19 m/s. The actual average velocity 212 is 1.17 m/s. In other embodiments, the known stroke length and stroke time may be different.

Figure 7C:
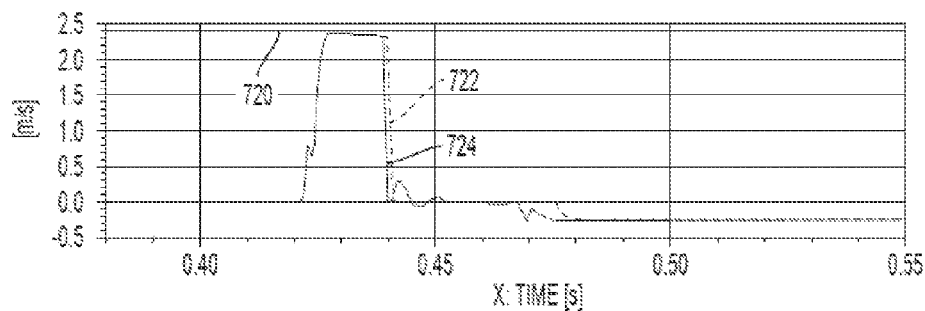
FIG. 7c is a plot of tappet velocity over time in accordance with the disclosure.

FIG. 7c shows a velocity profile 724 for the end stop 408 embodiment and a velocity profile 722 for the drain orifice 500 embodiment. The velocity profiles 724, 722 correspond to the displacement profile 716 and the displacement profile 718, respectively. For the shape of the velocity profiles 724, 722 in FIG. 7c, an actual peak velocity 720 is calculated. For the embodiment shown in FIG. 7a-c, the known stroke length is 36.9 mm and the calculated stroke time 702 is 16 ms. Therefore, the calculated peak velocity is 2.3 m/s. The actual peak velocity 720 is 2.36 m/s. In other embodiments, the known stroke length and stroke time may be different.

If the shape of the velocity profile is generally flat after a peak velocity is reached, forming a square wave as shown in FIG. 7c, the controller 114 will calculate and control the peak tappet velocity. The control on the peak stroke velocity for the square wave profile is effective because the peak stroke velocity is comparable to the average velocity. If the shape of the velocity profile is not generally flat after a peak velocity is reached, as in FIG. 2c, the controller 114 will calculate and control the average velocity. The shape of the velocity profile is based on the hardware components of the pump 100 and the size of system component such as the hydraulic accumulator. For a given pump configuration, through pre-testing, the controller 114 will receive information to determine the general shape of the velocity profile. If the controller 114 is calculating an average velocity, the controller 114 can apply a correction factor based on test data to predict the peak velocity.

INDUSTRIAL APPLICABILITY

Figure 8:
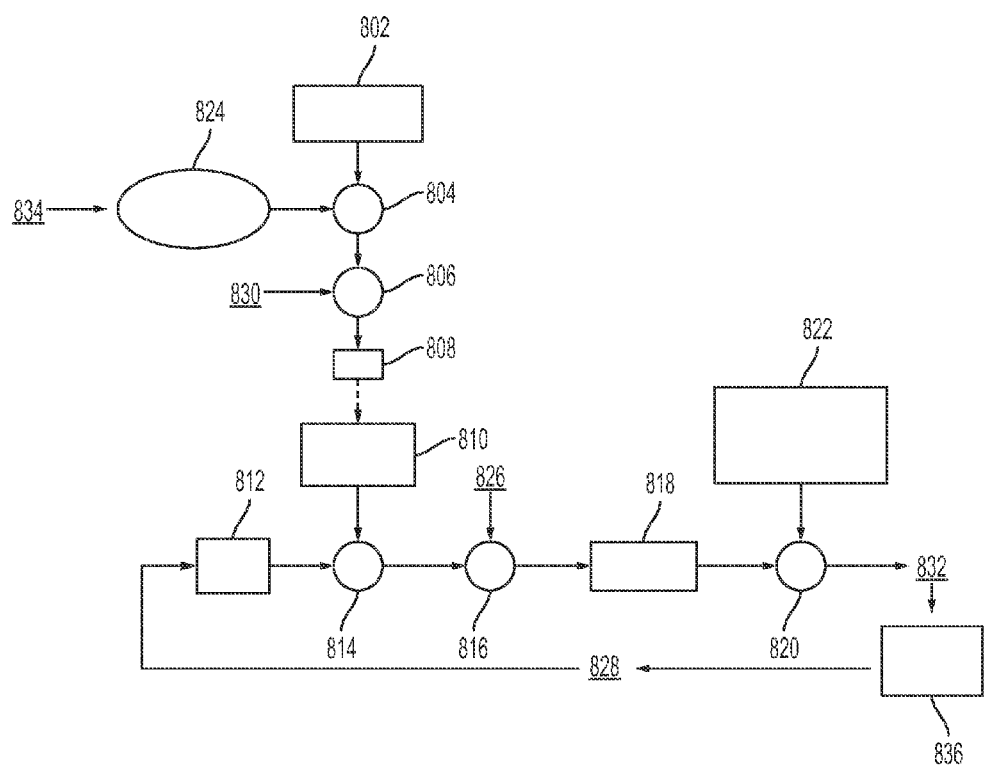
FIG. 8 is a block diagram of a piston control scheme in accordance with the disclosure.

The hydraulic pressure exerted on the top surface 328 of the tappet 322 actuates the extension stroke of the cryogenic pump 100. The hydraulic pressure exerted on the tappet 322 corresponds to the pressure in the hydraulic oil line 146. Thus, the pressure in the hydraulic oil line 146 is an effective controller of a tappet or stroke velocity. The controller 114 is configured to control the stroke velocity of the cryogenic pump 100 in the hydraulic system 101. As shown in FIG. 8, the controller 114 receives multiple inputs and sends an output as a command 832 to an engine system 836. The command 832 is configured to set the pressure in the hydraulic oil line 146. The controller 114 is configured to receive a first input, the first input being a gas accumulator pressure feedback 828. The controller 114 is configured to receive a second input, the second input being a tappet maximum displacement, or a stroke length 802. The controller 114 is configured to receive a third input, the third input being a signal from the at least one sensor 834. The controller 114 is configured to receive a fourth input, the fourth input being a reference stroke velocity 830. The controller 114 is configured to receive a fifth input, the fifth input being a hydraulic pressure feedback, 826.

A hydraulic intensification ratio is applied to the gas accumulator pressure feedback 828 to determine a minimum intensification pressure 812. The hydraulic intensification ratio is generally constant for a given system and represents a ratio between a reference gas accumulator pressure and a reference hydraulic accumulator pressure. For example, the intensification ratio may be two. The reference gas accumulator pressure and the reference hydraulic accumulator pressure represent pressure values that allow the cryogenic pump 100 to run efficiently. An efficient pump exerts enough power to push the LNG through to the vaporizer 118.

The controller 114 receives a signal from the at least one sensor 834 to detect an end of stroke and calculate a stroke time 824. The controller 114 calculates a stroke velocity 804 by dividing a stroke length 802 by the stroke time 824. The reference stroke velocity 830 is compared to the calculated stroke velocity 804 to determine an error in velocity 806. A correction 808 is applied based on the error in velocity 806. The correction 808 may include a proportional type controller or a proportional-integral-derivative ("PID") type controller. Alternatively, the correction 808 may include a lookup table. The correction 808 is configured to manipulate a hydraulic pressure proportional to the error in velocity 806 to provide an extra driving force to the cryogenic pump 100 to maintain the stroke velocity 804. A hydraulic pressure offset 810 is a summation of a reference offset pressure and the correction 808 proportional to the error in velocity 806. It can be appreciated that other correction than proportional may be made. The reference offset pressure is a nominal pressure needed to drive a piston at an intended velocity at a start of life of the pump 100. The hydraulic pressure offset 810 is added to the minimum intensification pressure 812 to generate a commanded hydraulic pressure 814. The commanded hydraulic pressure 814 is compared to the hydraulic pressure feedback 826 to determine an error in hydraulic pressure 816. A PID controller 818 receives the error in hydraulic pressure 816 as an input. A rate of the correction 808 based on the error in velocity 806 may be slower than a loop rate of the PID controller 818. An output from the PID controller 818 is used to determine a hydraulic pressure correction 820. The hydraulic pressure correction 820 is a summation of the output from the PID controller 818 and any feed forward term 822. The feed forward term 822 is a function of system components such as stroke volume and the number of pumping elements. The controller 114 is configured to use the hydraulic pressure correction 820 to send a command 832 to the engine system 836. The engine system 836 may be the hydraulic system 101 as shown in FIG. 1. In operation, the command 832 is configured to change the hydraulic pressure of the hydraulic oil line 146. For example, the command 832 activates the pump actuator 160 in the hydraulic pump 112. In operation, the pump actuator 160 changes the angle of the swash plate 150, which changes the hydraulic pressure of the hydraulic oil line 146. The change in the pressure of the hydraulic oil line 146 causes a corresponding change in the stroke velocity of the cryogenic pump 100.

The controller 114 can also be programmed to diagnose failures or abnormal operating conditions of the pump 100. In one embodiment, the controller 114 may compare at least one of a stroke time 824 and stroke velocity 804 with a corresponding, predetermined range of acceptable values of stroke times and stroke velocities. Depending on the result of the comparison, the controller 114 may provide a diagnostic indication such as a failure flag to indicate a failure or abnormal operating condition of the pump 100 when at least one of the stroke time 824 and stroke velocity 804 falls outside of the corresponding acceptable value range.

In another embodiment of the cryogenic pump 100, the cryogenic pump 100 includes a cryogenic swash plate, the cryogenic swash plate configured to pump cryogenic fluid. The cryogenic swash plate includes a first disk, a second disk, a central shaft, and an at least one tappet. The first disk and the second disk are both circular in shape and both form a central bore. The tappet is connected to the second disk at a radial distance from the center of the central bore of the second disk. When multiple tappets are connected to the second disk, the tappets are arranged such that they form a circular array about the center of the central bore of the second disk. The central shaft is configured to rotate about a longitudinal axis. The first disk is rotatably mounted to the central shaft such that rotational axis of the disk forms an oblique angle with the longitudinal axis of the central shaft. In operation, a rotation of the central shaft causes a corresponding rotation of the first disk. The rotation of the first disk is such that a point on an edge of the first disk describes a path that oscillates along the longitudinal axis of the central shaft. The second disk is configured to press against the first disk, but not rotate with respect to both the first disk and the central shaft. In operation, the pressure on the second disk imparted by the first disk causes the tappet on the second disk to move in a linear oscillating motion. The linear oscillating motion represents a pumping stroke of the cryogenic pump 100. A stroke time corresponds to a rotational velocity of the central shaft. A stroke length corresponds to the oblique angle. A stroke velocity is the stroke length divided by the stroke time. In operation, the controller 114 may control the stroke velocity by changing at least one of the rotational velocity of the central shaft and the oblique angle. The oblique angle may be changed by a hydraulic actuator that acts on the first disk. A hydraulic pump supplies hydraulic pressure to the hydraulic actuator.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for controlling a stroke velocity in a pump comprising:
   using a sensor that is in electrical communication with a controller to detect a start of a pump stroke;
   using the sensor to detect an end of the pump stroke;
   calculating a stroke time, the stroke time being a time period between the start of the pump stroke and the end of the pump stroke;
   calculating the stroke velocity based on a stroke length and the stroke time;
   comparing the calculated stroke velocity with a reference stroke velocity; and
   adjustably controlling a hydraulic supply pressure to the pump such that the hydraulic supply pressure is increased if the calculated stroke velocity is less than the reference stroke velocity, and the hydraulic supply pressure is decreased if the calculated stroke velocity is more than the reference stroke velocity.

2. The method of claim 1, wherein the sensor is a pressure sensor upstream from the pump.

3. The method of claim 1, wherein the sensor is a temperature sensor.

4. The method of claim 1, wherein the sensor is at least one pressure sensor inside the pump.

5. The method of claim 4, wherein the pump includes a hydraulic piston and a tappet guide, the hydraulic piston sealably and slidably housed within a bore formed by the tappet guide,
   wherein the at least one pressure sensor is in fluid communication with a tappet chamber, the tappet chamber being a sealed volume within the tappet guide and adjacent to the hydraulic piston.

6. The method of claim 5, wherein an end stop is positioned inside the pump, the end stop configured to amplify a pressure signal caused by an abutment of a pushrod with the end stop,
   wherein a top surface of the pushrod is in contact with a bottom surface of the hydraulic piston.

7. The method of claim 5, wherein the tappet guide forms an orifice perpendicular to an inside surface of the tappet guide.

8. The method of claim 5, wherein the tappet guide forms a bore that varies in diameter along a length of the tappet guide, the bore increasing in diameter, with respect to an axis of symmetry of the tappet guide, from a top surface of the tappet guide to a bottom surface of the tappet guide.

9. The method of claim 1, wherein the calculated stroke velocity is an average stroke velocity.

10. The method of claim 1, wherein the hydraulic supply pressure to the pump is controlled by a rotatably mounted swash plate within a hydraulic pump, wherein the hydraulic pump is in fluid communication with the pump.

11. A method for controlling a stroke velocity in a pump comprising:
    using a sensor that is in electrical communication with a controller to detect a start of a pump stroke;
    using the sensor to detect an end of the pump stroke;
    calculating a stroke time, the stroke time being a time period between the start of the pump stroke and the end of the pump stroke;
    calculating the stroke velocity based on a stroke length and the stroke time;
    calculating an error in velocity, the error in velocity being a difference between the calculated stroke velocity and a reference stroke velocity;
    applying a correction based on the error in velocity;
    determining a hydraulic pressure offset, the hydraulic pressure offset being a summation of a reference offset pressure and the correction based on the error in velocity;
    determining a minimum intensification pressure, the minimum intensification pressure being a gas accumulator pressure feedback divided by a hydraulic intensification ratio;
    calculating a commanded hydraulic pressure, the commanded hydraulic pressure being a summation of the hydraulic pressure offset and the minimum intensification pressure;

calculating an error in hydraulic pressure, the error in hydraulic pressure being a difference between the commanded hydraulic pressure and a hydraulic pressure feedback;
inputting the error in hydraulic pressure to a PID controller;
using an output from the PID controller to determine a hydraulic pressure correction; and
sending a command based on the hydraulic pressure correction to an engine system,
wherein the engine system responds to the command by changing the hydraulic pressure of a fluid supplied from a hydraulic pump to the pump.

12. The method of claim 11, wherein a rate of the correction based on the error in velocity is slower than a loop rate of the PID controller.

* * * * *